(12) United States Patent
Morper et al.

(10) Patent No.: US 10,039,032 B2
(45) Date of Patent: Jul. 31, 2018

(54) METHOD AND DEVICE FOR PROCESSING DATA IN A COMMUNICATION NETWORK

(75) Inventors: Hans-Jochen Morper, Erdweg (DE);
Ernst-Dieter Schmidt, Feldkirchen-Westerham (DE)

(73) Assignee: Xieon Networks S.a.r.l., Luxemburg (LU)

(*) Notice: Subject to any disclaimer, the term of this patent is extended or adjusted under 35 U.S.C. 154(b) by 74 days.

(21) Appl. No.: 13/824,673

(22) PCT Filed: Sep. 17, 2010

(86) PCT No.: PCT/EP2010/063727
§ 371 (c)(1), (2), (4) Date: Mar. 18, 2013

(87) PCT Pub. No.: WO2012/034600
PCT Pub. Date: Mar. 22, 2012

(65) Prior Publication Data
US 2013/0188490 A1 Jul. 25, 2013

(51) Int. Cl.
*H04W 28/10* (2009.01)
*H04W 36/02* (2009.01)

(52) U.S. Cl.
CPC ......... *H04W 28/10* (2013.01); *H04W 36/026* (2013.01)

(58) Field of Classification Search
USPC ............... 370/231, 235, 236, 312, 328, 338; 455/436, 442
See application file for complete search history.

(56) References Cited

U.S. PATENT DOCUMENTS

| | | | |
|---|---|---|---|
| 6,522,641 B1* | 2/2003 | Siu et al. ...................... | 370/338 |
| 2004/0081125 A1 | 4/2004 | Ranta-Aho et al. | |
| 2004/0085926 A1 | 5/2004 | Hwang et al. | |
| 2005/0049887 A1* | 3/2005 | Bulleit et al. .................. | 705/1 |
| 2005/0213545 A1* | 9/2005 | Choyi ..................... | H04L 45/00 370/338 |
| 2006/0062145 A1* | 3/2006 | Kirla ............................ | 370/230 |
| 2008/0132240 A1* | 6/2008 | Baek et al. ................... | 455/442 |
| 2008/0192694 A1* | 8/2008 | Lee et al. ...................... | 370/331 |
| 2009/0135829 A1* | 5/2009 | Zheng ................ | H04L 12/4625 370/395.1 |
| 2010/0202375 A1* | 8/2010 | Rydnell et al. ............... | 370/329 |
| 2012/0218970 A1* | 8/2012 | Westberg et al. ............. | 370/331 |

FOREIGN PATENT DOCUMENTS

| | | |
|---|---|---|
| EP | 1392075 A1 | 2/2004 |
| EP | 1796325 A1 | 6/2007 |
| EP | 2200367 A1 | 6/2010 |

* cited by examiner

Primary Examiner — Edan Orgad
Assistant Examiner — Saumit Shah
(74) Attorney, Agent, or Firm — Nelson Mullins Riley & Scarborough LLP (57) ABSTRACT

A method and a device for processing data in a communication network, wherein a first node is served by a second node and communicates with a third node. The first node informs a fourth node to process data destined for the third node. The second node, the first node and the fourth node are connected via a transport network that is capable of a point-to-multipoint connection.

14 Claims, 9 Drawing Sheets

METHOD AND DEVICE FOR PROCESSING DATA IN A COMMUNICATION NETWORK

BACKGROUND OF THE INVENTION

Field of the Invention

The invention relates to a method and to a device for processing data in a communication network.

Within the next years, broadband traffic via a fixed line is expected to grow by a factor of 40 and mobile data traffic is expected to grow by a factor of 200 to 300. This will put a substantial burden to existing network structures.

Such an increase of traffic is based on fundamental changes in technologies, architectures and infrastructure, e.g.,

- new radio standards (LTE and upcoming standards) enable a higher spectral efficiency;
- smaller cell sizes results in a increased number of base stations; and
- a huge amounts of traffic (comprising, e.g., video and audio streaming) is offloaded at home and at office areas.

Due to such an increase of mobile data traffic the mobile back haul is expected to become a major bottleneck. The increased number of cellular base stations to be connected with data rates amounting to 100 Mbit/s or more requires the back haul to cope with the additional traffic. Terrestrial transport lines convey the traffic between the base stations and the core network will become a significant cost factor for mobile network operators (MNOs), in particular as those lines are mostly leased from third parties and the costs are driven by the amount of data transported. The MNOs anticipate this fact by deploying microwave back haul systems, which provides point to point (PTP) connections or point to multipoint (PTMP) connections.

A mobile back haul currently may comprise base stations that are connected via gateways and the terrestrial network to mobility management entities (MMEs). The terrestrial network could be a transport network realized as copper lines (e.g., DSL), microwave radio or optical fibres.

Each base station is physically connected via a hub (a transport interchange), e.g., an Ethernet switch or an IP router.

In particular on the last mile of a radio access network (RAN), microwave transport can be utilized, e.g., in a P2P or P2MP manner. Hence, microwave transceivers can be connected to hubs thereby utilizing various types of physical infrastructure at the lower layers of the communication network.

In these scenarios, the base station, gateways, etc. are not aware of the underlying infrastructure, i.e. the microwave transport or the Ethernet transport can be used in a transparent manner for the upper layers (or can be exchanged without any interference with the upper layers).

In case a mobile device connected to a mobile communication network performs a handover from one base station to another base station, such handover is conducted seamlessly without the user becoming aware of it, i.e. without service interruption or service degradation. This follows a so-called "make-before-break" paradigm, according to which the new connection is set up before the old connection is terminated. Due to this paradigm, the mobile device—for some period of time—is connected to both base stations and thus traffic to and from this mobile device is conveyed across two links comprising also two back haul links.

According to LTE, during handover traffic is being transferred between the handover stations involved thereby tripling the traffic required to be conveyed to the mobile device. Particularly, this occurs at the edges of the RAN, where back haul transport is expensive.

With regard to UMTS, soft-combining results in mobile terminals being connected to several (e.g., more than three) base stations (NodeBs) at a time. If the base stations are served by different radio network controllers (RNCs), this will result in an inter-RNC traffic across an Iur-interface of significant scale.

BRIEF SUMMARY OF THE INVENTION

The problem to be solved is to overcome the disadvantages stated above and in particular to provide a solution to reduce redundant traffic in a communication network.

This problem is solved according to the features of the independent claims. Further embodiments result from the depending claims.

In order to overcome this problem, a method for processing data in a communication network is provided,

- wherein a first node is served by a second node and communicates with a third node;
- wherein the first node informs a fourth node to process data destined for the third node;
- wherein the second node, the first node and the fourth node are connected via a transport network that is capable of a point-to-multipoint connection.

The third node may in particular be a mobile node (e.g., a mobile terminal) that is served by the first node (e.g., a base station). The base station may be connected to the second node (e.g., a gateway) via a wireless or a wired line. The gateway may further be connected to another portion of the communication network, e.g., a core network, the Internet, etc.

It is noted, however, that the third node may be connected to the first node via a wired interface or a radio interface. The third node may become connected and thus is at least temporarily connectable to any of the first node or fourth node. There may be several nodes or entities of the same type as the third node.

It is further noted that each of the first node, second node and fourth node are connected via the transport network and thus may comprise an entity of the transport network that allows connection to and communication with the transport network. Such entity of the transport network could be a hub or any information exchange entity providing the service of the transport network to an upper layer.

Said traffic may be any kind of data, user data, program information, audio and/or video data, signaling information, management information, etc.

The fourth node can be informed via a control information that is sent by the first node toward the fourth node (e.g., to or via the second node). The control information may utilize a resource of the transport network, in particular the resource that is already in use for conveying traffic for the third node.

By utilizing the PTMP capability of a network in an efficient manner, unnecessary traffic to be conveyed between the first node, the second node and the fourth node is reduced. This approach is also beneficial if standby-serves deployed at various locations have to be synchronized.

In an embodiment, the fourth node is informed by the first node to process data destined for the third node via the second node.

Hence, the first node may inform the second node to inform the fourth node to process data destined for the third node.

In another embodiment, the fourth node is informed by the first node to process data destined for the third node via a management node.

Hence, for example a management entity (network management system, NMS) can be triggered either directly by the first node or by the second node to inform or instruct the fourth node to process the data accordingly.

It is noted that the data to be processed by the fourth node may be additional data further to the data that is already conveyed and processed at the fourth node. The fourth node can be informed via said control information conveyed across the transport network.

In a further embodiment, the second node comprises a gateway connected to a further network, wherein the gateway in particular provides at least one of the following services:
- authorization services;
- authentication services;
- rating services;
- traffic shaping services.

In a next embodiment, the transport network comprises an optical network.

The optical network may be an NGOA. The NGOA may be realized as lambda-per-user concept.

It is also an embodiment that the transport network comprises at least one microwave radio connection.

Hence, the first node, the second node and the fourth node share the same transport network.

Pursuant to another embodiment, resources of the point-to-multipoint system comprise at least one of the following:
- timeslots,
- frequencies,
- codes.

According to an embodiment, the first node and the fourth node are edge nodes of the communication network.

The first node and the fourth node could comprise base stations of a cellular communication network or they could comprise base station attached to microwave clients of a microwave radio system.

It is noted that the first node and the fourth node (as well as the second node) may be associated with an entity capable of communicating over the transport network. Such an entity could be a hub or any transport entity that is connected to the respective upper-layer entity of the node, e.g., base station. Hence, the service of the underlying transport entity is provided (preferably in a transparent manner) to the upper-layer entity. In other words, the upper-layer entity does not have to be aware of the underlying structure. Advantageously, the underlying structure can be replaced by a different type which allows a high degree of flexibility.

According to another embodiment, the third node is at least temporarily connected to the first node and/or the fourth node via an air interface.

It is noted that the third node could be a mobile terminal of a cellular communication network.

In yet another embodiment, the third node is handed over from the first node to the fourth node.

Hence, a handover can be conducted by utilizing the transport network in an efficient manner avoiding unnecessary multiplication of traffic.

According to a next embodiment, the first node informs the fourth node or the second node to process data destined for the third node by utilizing a resource of the transport network that is used for the communication between the second node and the first node.

Hence, the same resource can be utilized for conveying instruction information to the fourth node.

Pursuant to yet an embodiment, the first node, the second node and/or the fourth node each comprises an underlying transport entity that provides the service of the transport network and wherein the first node or the second node informs the transport entity of the fourth node to process data destined for the third node.

According to another embodiment, the first node informs the fourth node and/or the second node to process data destined for the first node.

Hence, it is an option to inform the fourth node and/or the second node that all traffic for the first node is to be processed at a different location. This could be useful in case the first node determines a failure or becomes inactive.

The problem stated above is also solved by a device for processing data in a communication network comprising a processing unit that is arranged
- for being served by a second node;
- for serving a third node;
- for informing a fourth node to process data destined for the third node;
- wherein the second node, the device and the fourth node are connected via a transport network that is capable of a point-to-multipoint connection.

The fourth node can be informed directly by the device or via the second node or a management entity (e.g. an NMS).

The second node may be a gateway that provides a PTMP connection towards the first node and the fourth node.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

According to an embodiment, the device is an edge node of the communication network, in particular a base station.

It is also an embodiment that the device comprises an entity of the transport network, e.g., a hub or an exchange entity, which provides the service of the transport network in a transparent manner.

Furthermore, the problem stated above is solved by a communication system comprising at least one device as described herein.

Embodiments of the invention are shown and illustrated in the following figures:

DESCRIPTION OF THE INVENTION

Figure 1:
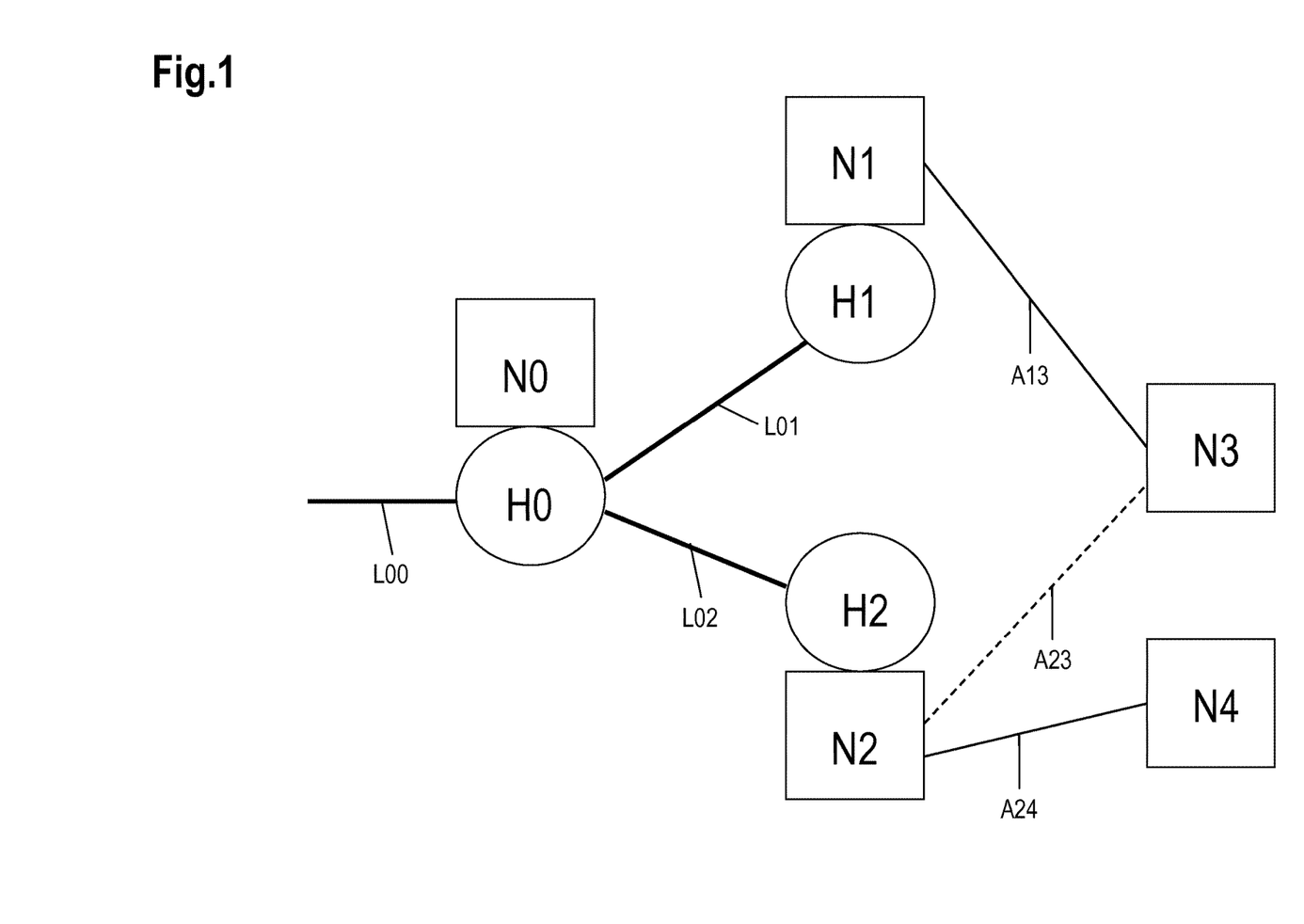
FIG. 1 shows a schematic diagram comprising a network with network nodes N0 to N4, wherein the node N0 may be a gateway node to the Internet (or any other network), the nodes N3 and N4 being end nodes (e.g., terminals, in particular mobile terminals) and the nodes N1 and N2 being edge nodes of the network (e.g., radio base stations)

FIG. 1 shows a schematic diagram comprising a network with network nodes N0 to N4, wherein the node N0 may be a gateway node to the Internet (or any other network), the nodes N3 and N4 being end nodes (e.g., terminals, in particular mobile terminals) and the nodes N1 and N2 being edge nodes of the network (e.g., radio base stations).

Each node N0 to N2 has physical access to a transport network via a hub H0 to H2. The end nodes N3 and N4 are each connected to the transport network via the edge hubs using connection links, e.g., an air interface. Hence, the end node N3 is connected to the edge node N1 via the hub H1 using an air interface A13 and the end node N4 is connected to the edge node N2 via the hub H2 using an air interface A24. The edge node N1 is connected to the gateway node N0 via the hubs H1 and H0 across a line L01 and the edge node N2 is connected to the gateway node N0 via the hubs H2 and H0 across a line L02. The gateway node N0 is connected via the hub H0 across a line L00 to the Internet (or any network). The end nodes N3 and N4 exchange data with the Internet via the Nodes N0, N1 and N2.

If the air interface A13 experiences a disturbance, becomes defective or experiences a quality degradation, an air interface A23 via the edge node N2 can be used to connect the node N3 with the Internet. Hence, for a period of time, two air interfaces A13 and A23 are used to convey traffic between the end node N3 and the Internet. For proper data transmission purposes, the node N1 mirrors the traffic that is destined for the end node N3 towards the node N2 (via the node N0). The nodes are unaware of the underlying physical transport means (layer) and utilize the hubs H0 to H2 to reach the end node N3 via the node N2. As a result, instead of transmitting the traffic once via the link L01 to the node N1 and thus to the node N3, this traffic is conveyed three times via the transport layer of the fixed network, i.e. from the hub H0 to the hub H1, then back from the hub H1 to the hub H0 and further from the hub H0 to the hub H2.

In order to avoid such a multiplication of traffic load, the approach presented herein advantageously utilizes the fact that in various scenarios, point-to-multipoint technologies are employed, such as passive optical networks or microwave links. Up to now, the entities (e.g., nodes as shown in FIG. 1) are unaware of the (underlying) transport technology. In addition to that, the entities may determine whether the underlying transport technology has a point-to-multipoint capability, or at least part of the transport layer provides such a capability (which may be likely for radio access network deployments).

A point-to-multipoint (PTMP) transport technology provides the characteristics that an information is sent (from a "point") to a number of recipients ("multi points") with each of the recipients picking (using) only those data packets that are addressed to it.

PTMP may work on an "on-demand" random-access scheme based on a collision bus (CSMA, e.g., WiFi). As an alternative, the available spectrum may be divided into channels, wherein a channel separation is based on frequencies (FDMA), timeslots (TDMA) and/or codes (CDMA). Uplink and downlink are separated either in time (TDD) or frequency (FDD).

Figure 2:
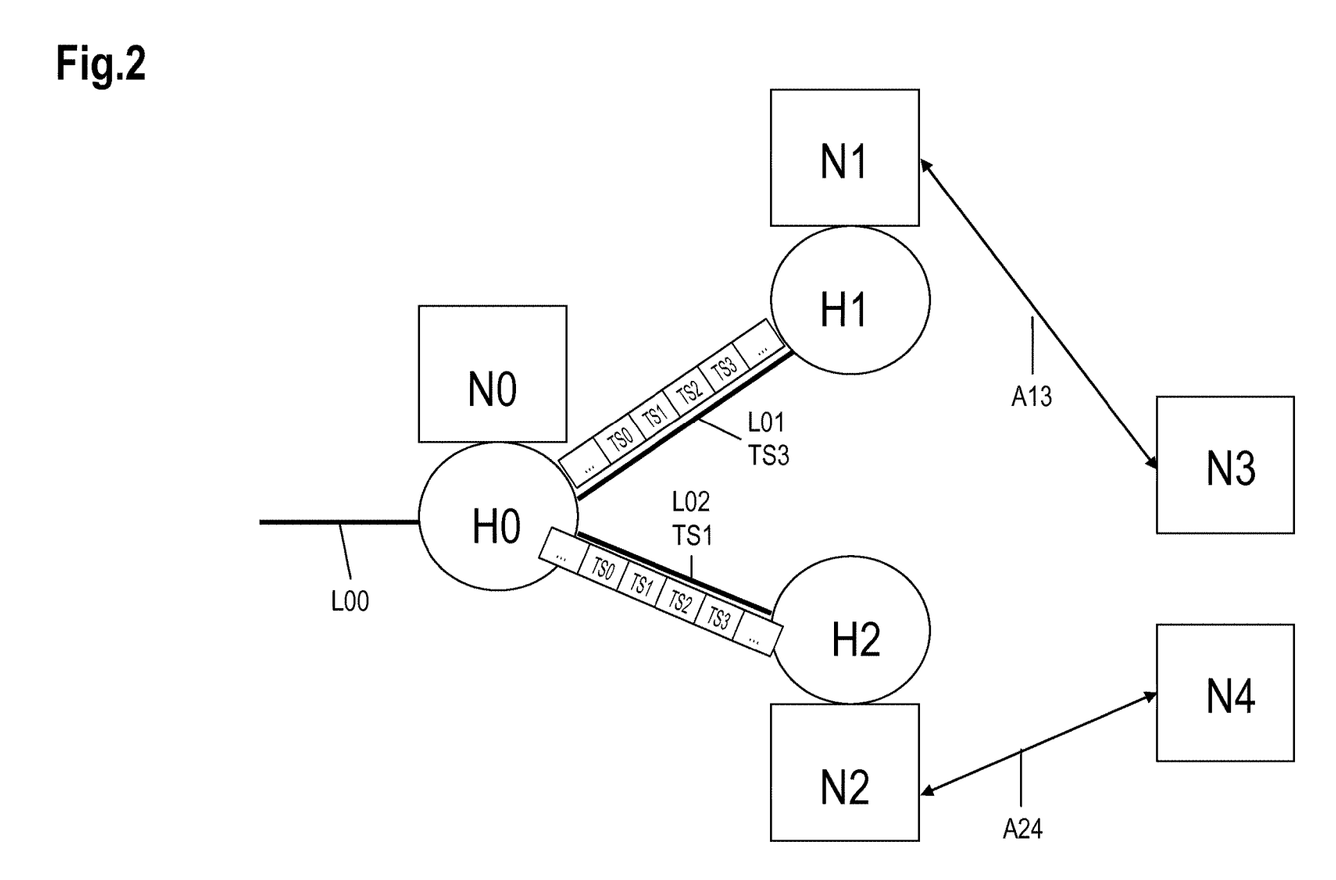
FIG. 2 shows a basic diagram of the network of FIG. 1, wherein the nodes N1 and N2 are connected to the node N0 via a PTMP system based on timeslots.

FIG. 2 shows a basic diagram of the network of FIG. 1, wherein the nodes N1 and N2 are connected to the node N0 via a PTMP system based on timeslots TS0 to TS3 (i.e. four repeating timeslots).

Traffic exchanged between the end nodes N3, N4 and the Internet (or any network) connected to the line L00 passes the edge nodes N1, N2 and the (gateway) node N0 via a PTMP system running between the transport hub H0 and the edge hubs H1, H2. The PTMP system comprises four timeslots TS0 to TS3, wherein the timeslot TS3 carries the traffic between the hub H0 and the hub H1 over the link L01. The timeslot TS1 is used on the link L02 between the hub H0 and the hub H2 to convey the associated traffic for the end node N4. Hence, the hub H2 processes the timeslots TS1 and the hub H1 processes the timeslots TS3. The two resources (timeslots TS1 and TS3) are thus occupied and not available for other hubs.

Figure 3:
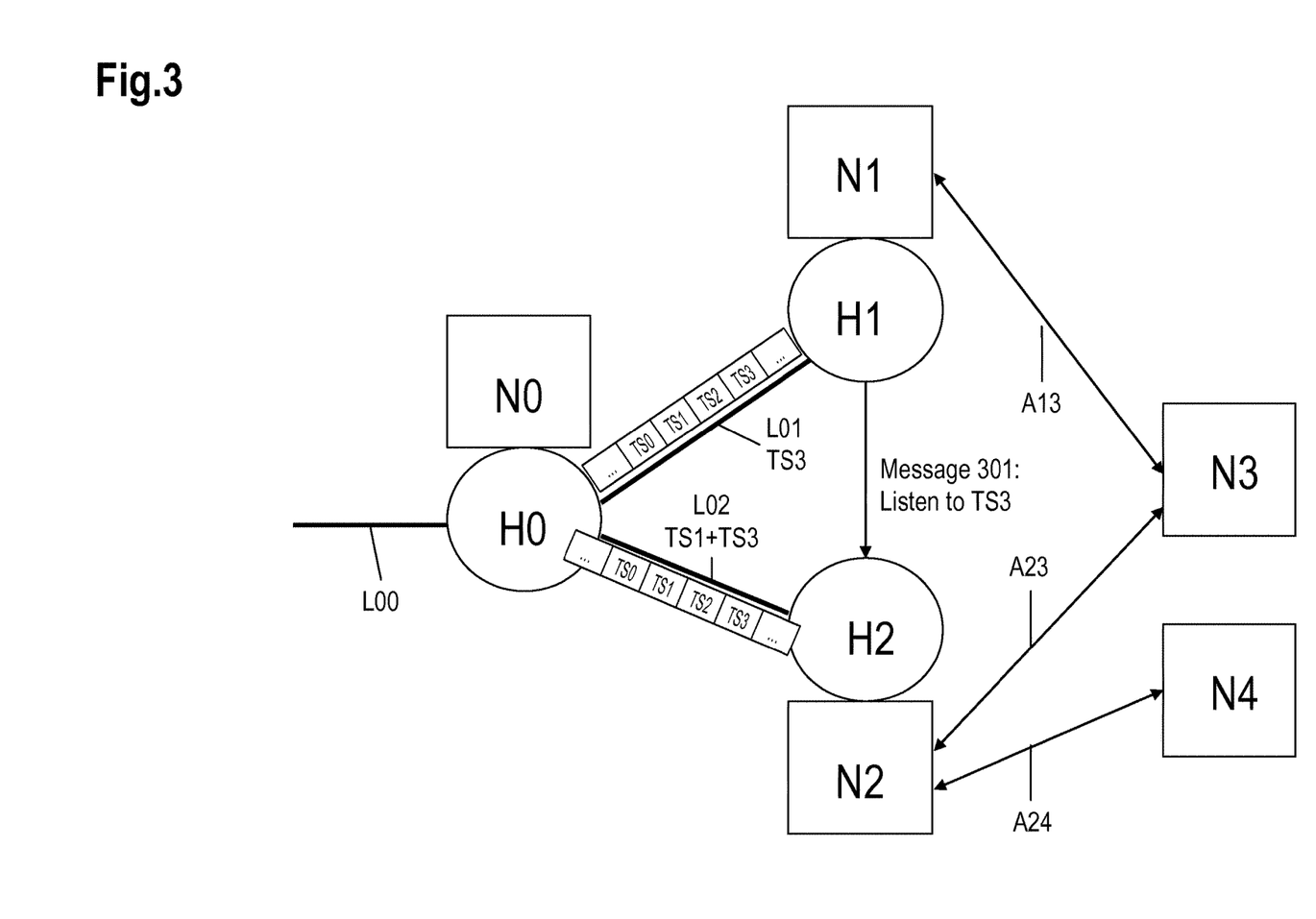
FIG. 3 shows a block diagram based on the scenario of FIG. 2, wherein the end node is handed over form a first edge node to a second edge node.

FIG. 3 shows a block diagram based on the scenario of FIG. 2, wherein the end node N3 requires the air interface A23 to the edge node N2, e.g., because the air interface A13 deteriorates and an ongoing transmission of/to the end node N3 is to be maintained. This scenario could be applicable for the end node N3 being a mobile terminal that is experiences a handover from the node N1 to the node N2. The node N2 has to provide and thus transport the traffic for this node N3 (i.e. the same traffic that is conveyed by the node N1 to the node N3).

Therefore, the node N1 forwards the traffic destined for the node N3 back to the node N0, which then conveys it to the node N2 for further conveying it towards the end node N3 (via the air interface A23 as shown). The traffic is "mirrored" from the node N1 to the node N2 via the hubs H1, H0 and H2. If the nodes are not aware of a PTMP transport capability (or in case no PTMP transport capability is available), a new timeslot TS2 may be allocated on the line L01 for exchanging traffic and/or information between the hubs H1 and H0. In such case, another timeslot TS0 may be allocated on the line L02 for exchanging traffic and/or information between the hubs H0 and H2. Hence, two further resources (timeslot TS2 on the line L01 and timeslot TS0 on the line L02) are occupied and cannot be used for other traffic. It is noted that in this example all such resources TS3, TS2, TS0 are merely used for conveying traffic to the end node N3.

A more efficient solution is described also with regard to FIG. 3: The traffic is not resent between the nodes N1 and N2 (via the node N0). Instead, the architecture suggested utilizes the PTMP feature of the underlying transport layer in an efficient manner.

The target node N2, in particular the hub H2 of the target node N2, is informed (via a message 301) that it also has to process the traffic destined for the node N1 (and/or the hub H1) in addition to the traffic destined to itself. According to the example depicted in FIG. 3, the node N2 and/or the hub H2 thus has to process the traffic of the timeslots TS1 (own traffic) and TS3 (traffic destined for the node N1 and/or the hub H1).

Next, the hub H0 associated with the node N0 may transfer all packets of the timeslot TS1 destined for the node N4 and all packets of the timeslot TS3 destined for the node N3 towards the node N2. The node N3 can thus be connected via the air interface A23 without any duplication of traffic in the access network.

It is noted that the nodes N1, N2 do not have to be transport sensitive: The node N1 may establish a transport connection to the node N2 with the transport system assigning the same resource to both hubs (TS3 to H1 and H2). Since data transferred by either node (N1 or N2) for the end node N3 is the same, regardless of whether the source or destination is at the node N1 or at the node N2 the "reuse" of this resource is feasible without corrupting the payload data.

Example: Microwave-Based System

Figure 4:
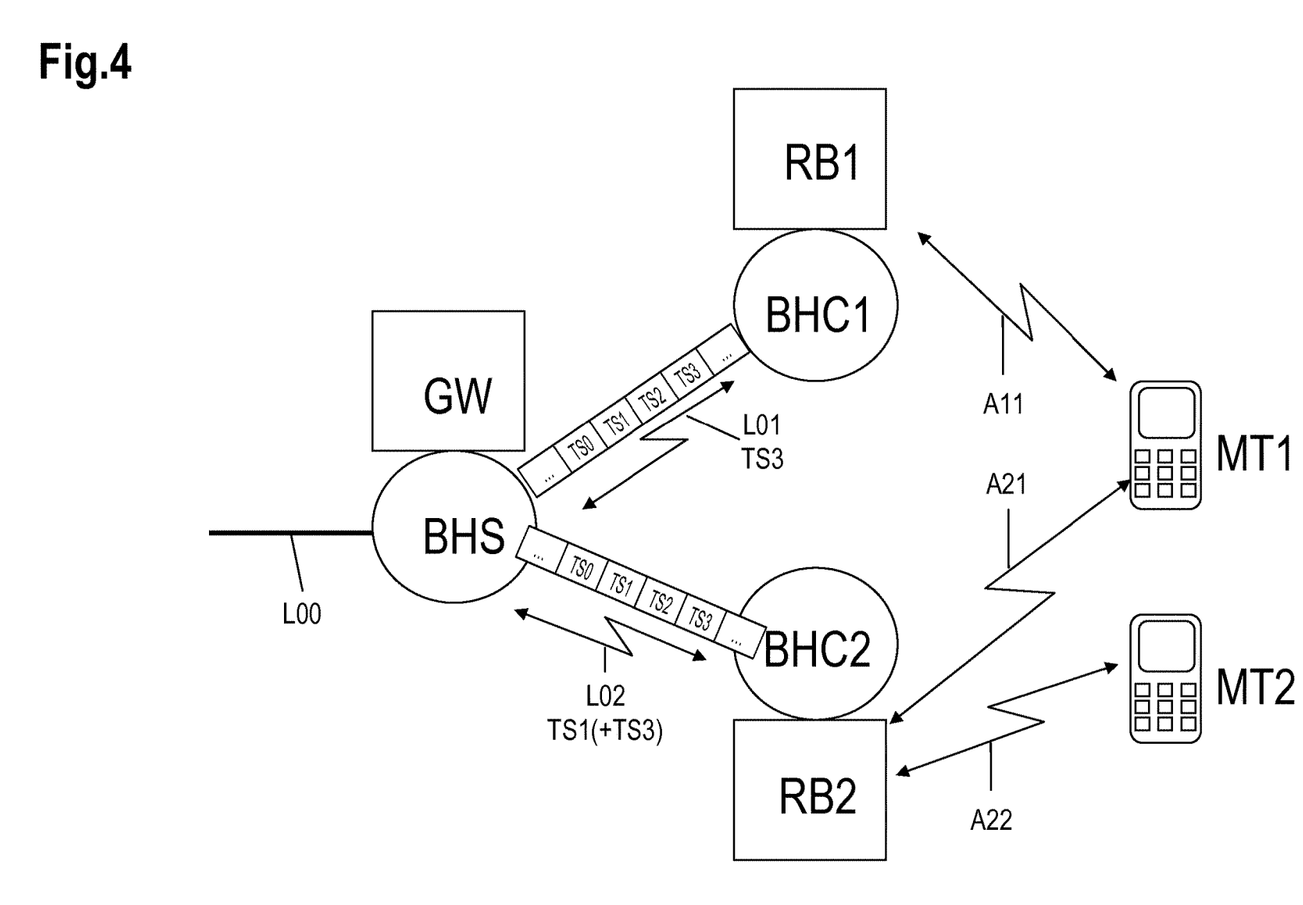
FIG. 4 shows a schematic block diagram of a communication architecture comprising a mobile terminal that is connected via a wireless interface to a cellular base station, which is connected to a PTMP-capable microwave client and another mobile terminal is connected via a wireless interface to another cellular base station, which is connected to another PTMP-capable microwave client.

FIG. 4 shows a schematic block diagram of a communication architecture comprising a mobile terminal MT1 that is connected via a wireless interface A11 to a cellular base station RB1, which is connected to a PTMP-capable microwave client BHC1. A mobile terminal MT2 is connected via a wireless interface A22 to a cellular base station RB2, which is connected to a PTMP-capable microwave client BHC2.

The microwave client BHC1 is connected via a (wireless) line L01 to a microwave hub BHS to which a gateway GW is attached. The microwave client BHC2 is connected via a (wireless) line L02 to the microwave hub BHS. The gateway GW could be a border node (mobility anchor) of a cellular network connecting it to any other network, e.g., the Internet. The gateway GW may provide some authorization procedures (determining whether a user or subscriber is allowed using a particular service), authentication services, rating (e.g., after a service has been used for a pre-defined amount of time, an additional amount of time is free of charge), traffic shaping (e.g., after a subscriber has consumed its monthly traffic budget s/he will be assigned only a portion of the bandwidth), etc. With the gateway GW being the mobility anchor, no point of the other network may be able to see beyond the gateway GW, e.g., determine devices of the cellular network that are connected to the gateway GW. The gateway GW may be connected close or far-off to the microwave hub BHS. In comparison to the LTE-RAN, the gateway GW may comprise a (portion of the) functionality of an S-GW, a P-GW and an MME.

The microwave hub BHS is connected via a line L00 to at least one (further) network, e.g., the Internet.

In a first phase, the mobile terminal MT1 is connected to the base station RB1 via the air interface A11. The timeslot TS3 is used for conveying traffic between the microwave hub BHS and the microwave client BHC1 for this mobile terminal MT1. Also, the mobile terminal MT2 is connected to the base station RB2 via the air interface A22 and the timeslot TS1 is used for conveying traffic between the microwave hub BHS and the microwave client BHC2 for this mobile terminal MT2.

In a second phase, the mobile terminal MT1 is handed over from the base station RB1 to the base station RB2. During the handover, a connection with both base stations RB1 and RB2 is established for a given time period. During this time period, the base station RB1 mirrors all traffic related to the mobile terminal MT1 towards the base station RB2. Therefore, the microwave client BHC2 that is associated with the base station RB2 is instructed by the microwave hub BHS to process ("listen to") the timeslot TS3 (in addition to the already processed timeslot TS1).

In a third phase after the handover has been successfully concluded, the microwave client BHC1 does no longer have to convey the traffic of the timeslots TS3 to its base station RB1. Instead, the microwave client BHC2 continues conveying the traffic of the timeslots TS3 to its base station RB2, which further conveys such traffic towards the mobile terminal MT1 via the air interface A21. In other words, the MT1 after being handed over to the base station RB2 is served by this base station RB2 via the PTMP transport network comprising TDD resources conveyed between the microwave hub BHS and the microwave client BHC2.

Figure 5:
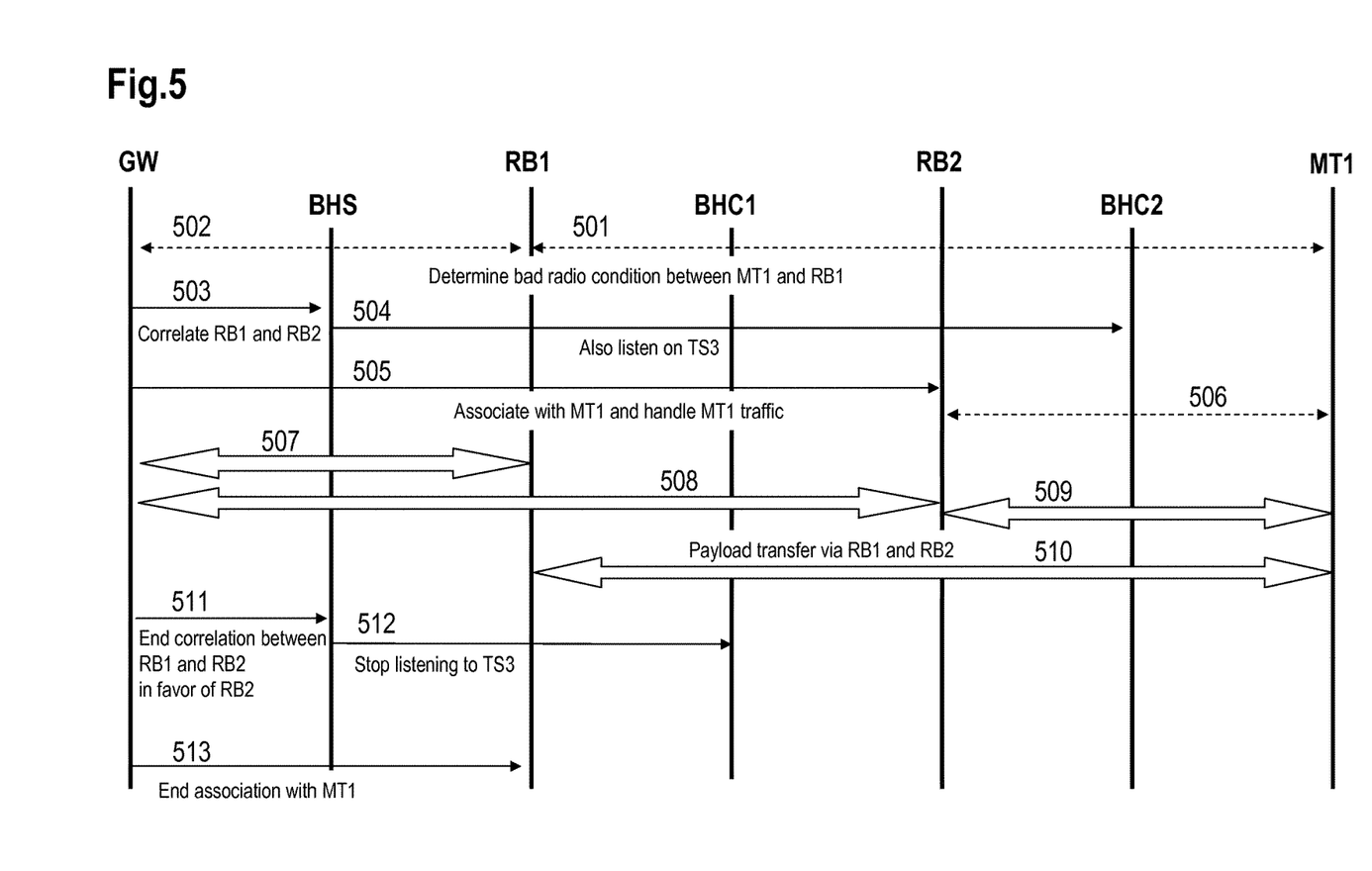
FIG. 5 shows a message diagram depicting message and data flows between the components shown in FIG. 4.

FIG. 5 shows a message diagram depicting message and data flows between the components shown in FIG. 4 according to the phases one to three as described above. In an exemplary embodiment, the gateway GW acts as a mobility anchor and has the capability to give instructions to a control plane of the transport network.

A message 501 indicates that a bad radio condition between the mobile terminal MT1 and the base station RB1 is detected. This information is conveyed (see message 502) to the gateway GW. Thus, the necessity for a handover can be determined by the gateway GW or its mobility management function by analyzing measurement reports received from the mobile terminal MT1.

The gateway GW instructs (see message 503) the microwave hub BHS to correlate the base stations RB1 and RB2. Hence, the microwave hub BHS instructs via a message 504 the microwave client BHC2 to also listen to the timeslot TS3 (containing traffic for the mobile terminal MT1).

A message 505 indicates that the gateway GW instructs the base station RB2 to become associated with (responsible for) the mobile terminal MT1 and handle its traffic. The base station RB2 and the mobile terminal MT1 may thus exchange pairing information (optional, see message 506).

Thus, the gateway GW may instruct the transport network (see messages 504, 505) via a control interface of the microwave hub BHS, to "associate" two links, i.e. the links of the microwave clients BHC1, BHC2, to which the base station RB1 and the base station RB2 are connected to. In case the underlying transport network does not provide PTMP capabilities, this association instruction may lead to no activity and an actual mirroring (duplication) of data as it is done today could be a feasible fall-back solution.

The gateway GW further provides mutual information about the base stations involved to the base stations involved (associate) and those base stations may thus setup a link. In the transport network, this may not lead to a new connection, but rather be a "reuse" of an existing one. During this whole second phase, the same traffic (with respect to the mobile terminal MT1) is conveyed towards the base station RB1 and the base station RB2.

As shown by messages 507 and 508, traffic is conveyed from the gateway GW via its microwave hub BHS towards the base stations RB1 and RB2 (actually via their respective microwave clients BHC1 and BHC2). The base station RB1 as well as the base station RB2 both provide payload transfer for the mobile terminal MT1 (see messages 509 and 510).

By a message 511, the gateway GW instructs the microwave hub BHS to de-correlate the base stations RB1 and RB2, i.e. to convey the traffic for the mobile terminal MT1 only via the base station RB2. This message 511 also indicates the end of the handover. The microwave hub BHS sends a message 512 to the microwave client BHC1 instructing it to cease listening to the timeslot TS3. The gateway GW informs the base station RB1 to end its association with the mobile terminal MT1. Hence, the mobile terminal is now attached and served by the base station RB2 via the microwave client BHC2.

Example: NGOA-Based System

Figure 6:
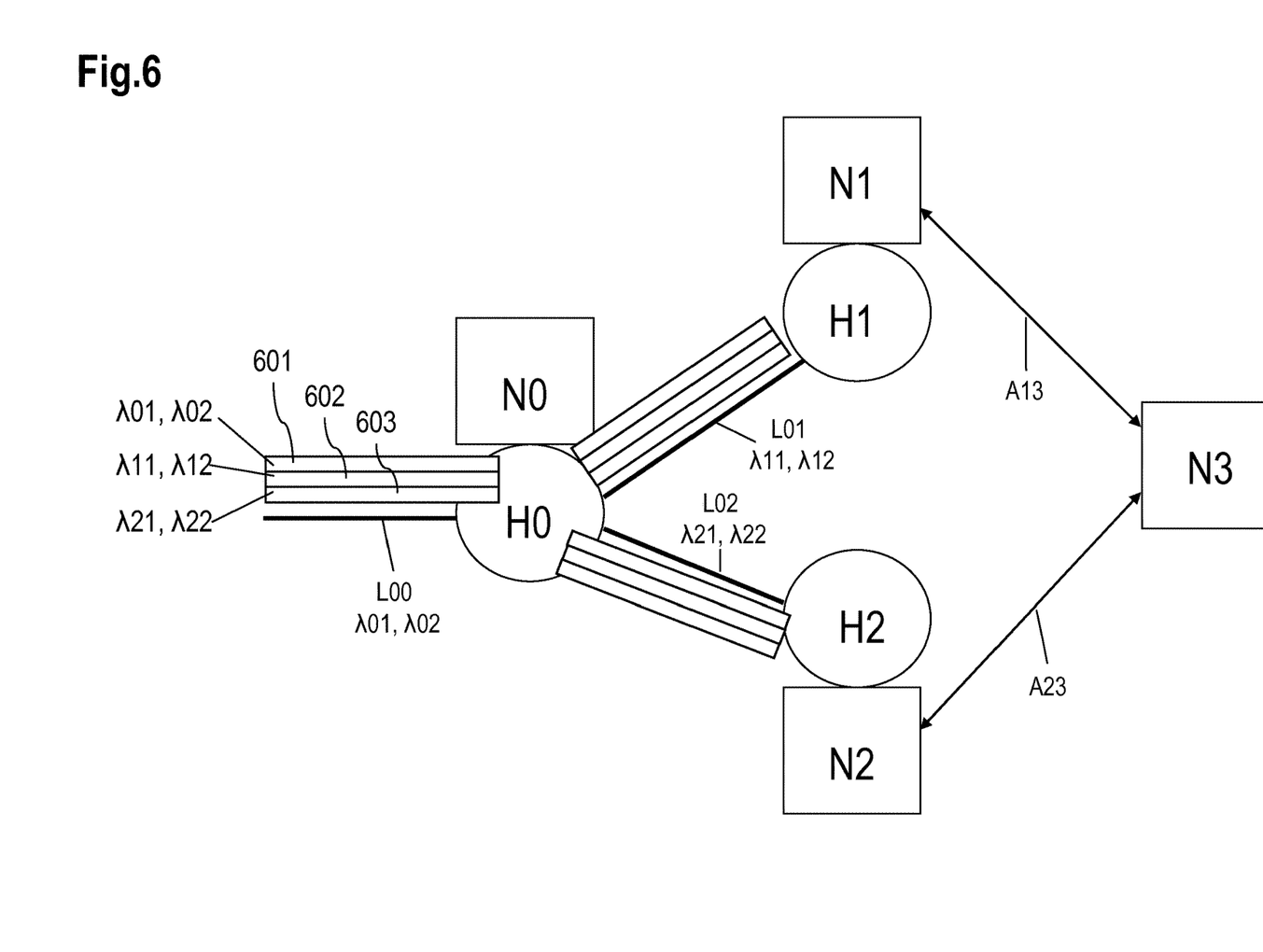
FIG. 6 shows a block diagram of a communication network utilizing an NGOA-based system.

FIG. 6 shows a block diagram of a communication network utilizing an NGOA-based system. The NGOA may be realized as lambda-per-user concept.

The network of FIG. 6 comprises the same entities as shown in FIG. 1. Hence, reference is made to the explanations provided above.

With regard to the NGOA system, it is assumed that all hubs H0 to H1 utilize at least one distinct wavelength. Thus the nodes N0, N1 and N2 can be interconnected via wavelength pairs (one wavelength for uplink traffic and another for downlink traffic). It is noted that the term "wavelength" may refer to a wavelength range or frequency range and provide an optical (end-to-end) resource that could be utilized for data communication purposes. It is further noted that the resources in uplink and downlink direction may be asymmetrical and thus provide different data rates or quality of service. Of course, it is also an option to provide symmetrical resources in uplink and downlink direction.

As shown in FIG. 6, each link L00, L01 and L02 comprises at least one optical fiber conveying optical resources (e.g., wavelengths or bandwidth ranges of a predefined spectrum around such wavelength): A resource 601 comprises wavelengths λ01 and λ02 (uplink and downlink direction), a resource 602 comprises wavelengths λ11 and λ12 and a resource 603 comprises wavelengths λ21 and λ22.

During a handover phase, the optical modem at the hub H2 may be tuned to the wavelengths used in the hub H1 for listening to traffic destined for the end node N3 (the handover scenario of the node N3 is the same as described above).

Hereinafter, an implementation example is described in more detail based on a NGOA as back haul for a mobile network.

The PON comprises an OLT which is connected via a fibre to several ONUS. A single fibre can be split up into many fibres via an optical splitter. Hence, each ONU receives the same information that is conveyed over the fibre. There may be a fibre connection in uplink and in downlink direction. Each direction may utilize a timeslot scheme for providing channels and separating information between the OLT and the ONUs. For example, traffic can be conveyed from the OLT to one ONU using at least one channel (timeslot), wherein the OLT marks the traffic in the packet (timeslot) with a target address of the ONU. In case the OLT sends a packet to an ONU, the OLT may pick a free timeslot, mark the packet with the address of this ONU and send it over the fibre. Any ONU attached to the fibre (e.g., via said splitter) receives this packet, but only the ONU addressed processes it; the other ONUS discard the packet, because it was not destined for them.

Figure 7:
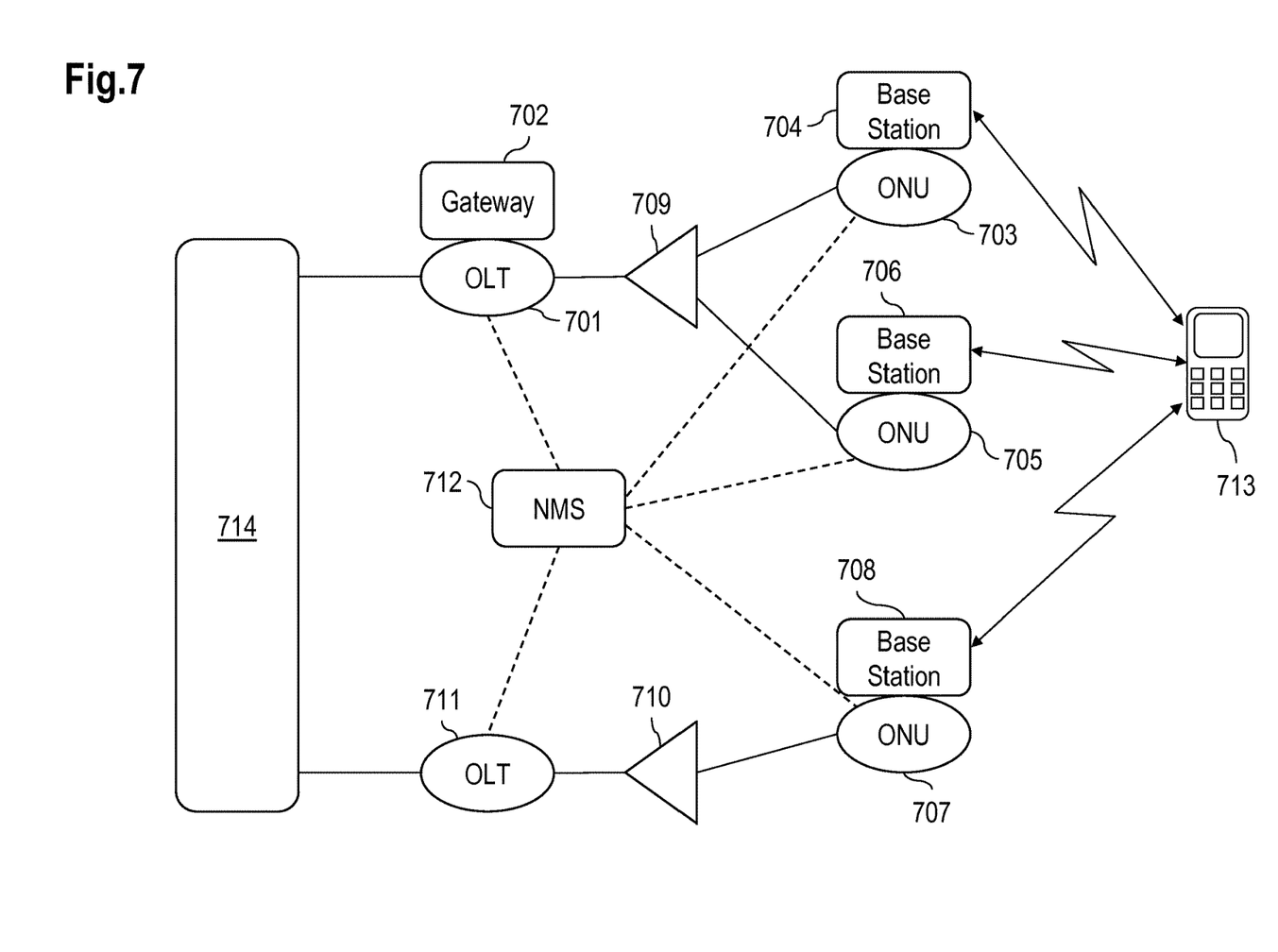
FIG. 7 shows a schematic architecture of an optical back haul network.

FIG. 7 shows a schematic architecture of an optical back haul network. An OLT 701 is associated with a gateway 702 and connected to a network 714 (any network or an optical core network). The OLT 701 is further connected via a splitter 709 to several ONUS 703 and 705, wherein each ONU 703, 705 is associated with a base station 704, 706. Another OLT 711 is connected also to the network 714 and via a splitter 710 to an ONU 707 with which a base station 708 is associated. A mobile terminal 713 may be connected via an air interface to any of the base stations 704, 706 or 708. In addition, a network management system (NMS) 712 is provided that may communicate with the OLTs 701, 711 or the ONUS 703, 705, 707. Hence, the NMS 712 may configure any of the PON nodes in any of the PON systems; for example, the NMS 712 could assign ONU-IDs to the different ONUS.

The base station 704, 706, 708 being associated with the respective ONU 703, 705, 707 means that the ONUS provide the transport layer for the respective base stations.

In the example shown in FIG. 7, the gateway 702 can be co-located with the OLT 701 and the base stations 704, 706, 708 can be co-located with the ONUS 703, 705, 707. The base stations 703, 705 are associated with the PON of the OLT 701 and the base station 708 is associated with the PON of the OLT 711.

For example, in a 10G PON, up to 128 ONUS can be connected to a single OLT; hence, up to 128 base stations may be connected to one PON.

In case the mobile terminal 713 performs a handover, the two affected base stations may be connected to the same PON (intra-PON handover) or to different PONs (inter-PON handover).

Figure 8:
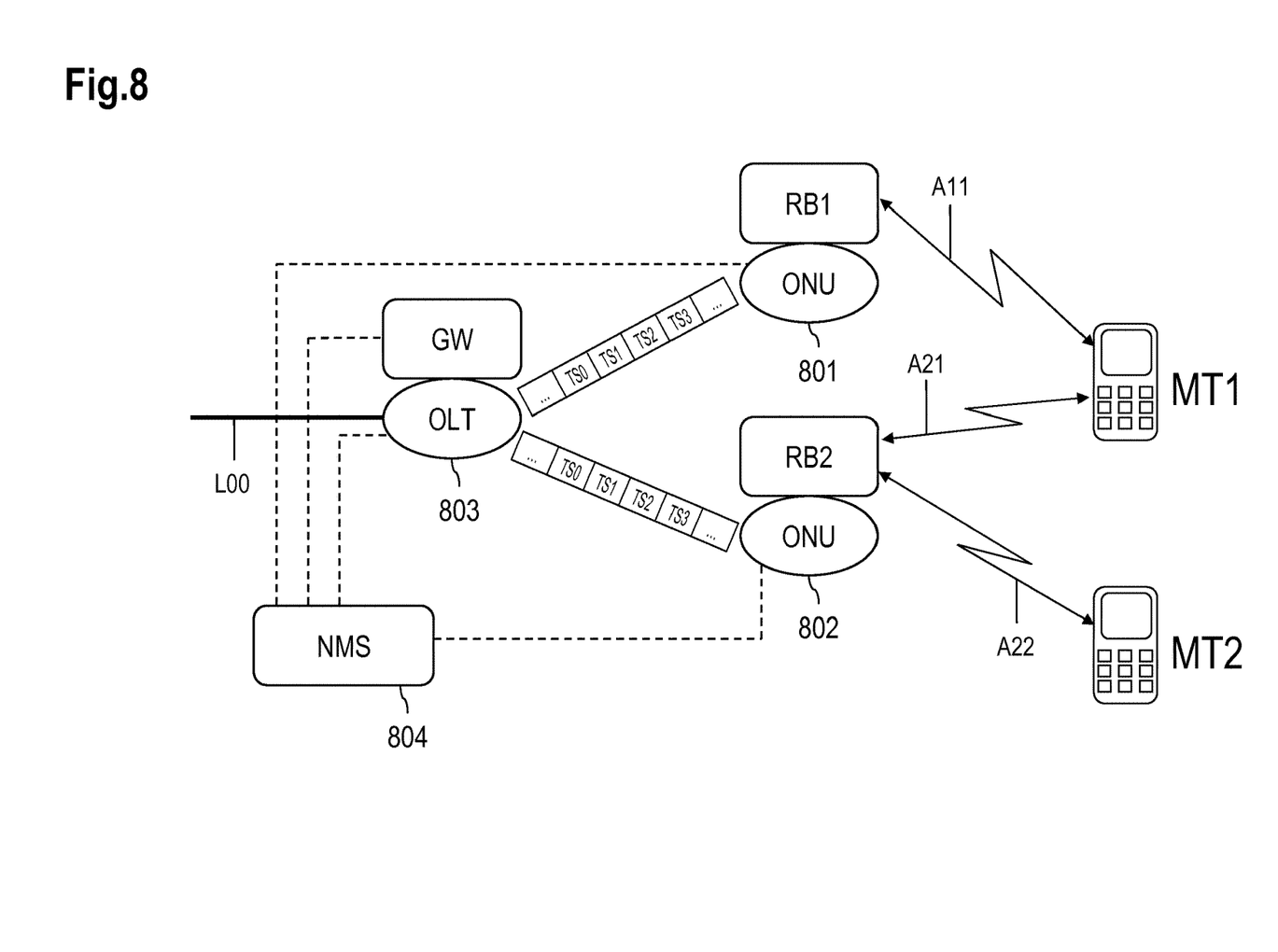
FIG. 8 shows a schematic block diagram of a communication architecture comprising a mobile terminal that is connected via a wireless interface to a cellular base station, which is connected to a PTMP-capable ONU and a second mobile terminal that is connected via a wireless interface to another cellular base station, which is connected to another PTMP-capable ONU.

FIG. 8 shows a schematic block diagram of a communication architecture comprising a mobile terminal MT1 that is connected via a wireless interface A11 to a cellular base station RB1, which is connected to a PTMP-capable ONU 801. A mobile terminal MT2 is connected via a wireless interface A22 to a cellular base station RB2, which is connected to a PTMP-capable ONU 802.

The ONU 801 is connected to an OLT 803 to which a gateway GW is attached. The ONU 802 is also connected to the OLT 803. The OLT 803 is connected via a line L00 to a (further) network, e.g., an optical core network. A NMS 804 is provided to configure any of the PON nodes, i.e. the OLT 803 and/or the ONUS 801, 802. The gateway GW may also be connected to the NMS 804.

In case the necessity for a handover is detected (in the example according to FIG. 8, a handover of the mobile terminal MT1 from the base station RB1 to the base station RB2 is conducted), e.g., by the gateway GW based on measurement reports provided by the mobile terminal MT1, the gateway GW may instruct the NMS 804 (e.g., via HTTP or SNMP) to setup a connection between the affected base stations RB1 and RB2. The NMS 804 is aware of the fact that the base stations RB1 and RB2 are in the same PON. The NMS 804 may in particular be able to check whether the base stations RB1 and RB2 are part of the same PON. If this is not the case, traffic from the base station RB1 can be transferred to the base station RB2 (and vice versa). If the base stations RB1 and RB2 are part of the same PON, the NMS 804 instructs the ONU 802 to also listen to the packets which are destined for the ONU 801 (i.e. process traffic that is addressed to the ONU 801 also). This has the same effect as if the base station RB1 would send the traffic to the base station RB2. During handover, the base stations RB1 and RB2 may thus both send the same traffic to the mobile terminal MT1.

After the handover has been successfully completed, the gateway GW may inform the NMS 804 to tear down the "RB1-RB2 connection" (i.e. the traffic for the mobile terminal MT1 does no longer have to be conveyed by the base station RB1, because the mobile terminal MT1 is now attached to and served by the base station RB2). Hence, the NSM 804 instructs the ONU 802 to no longer listen to the packets destined for the ONU 801.

Figure 9:
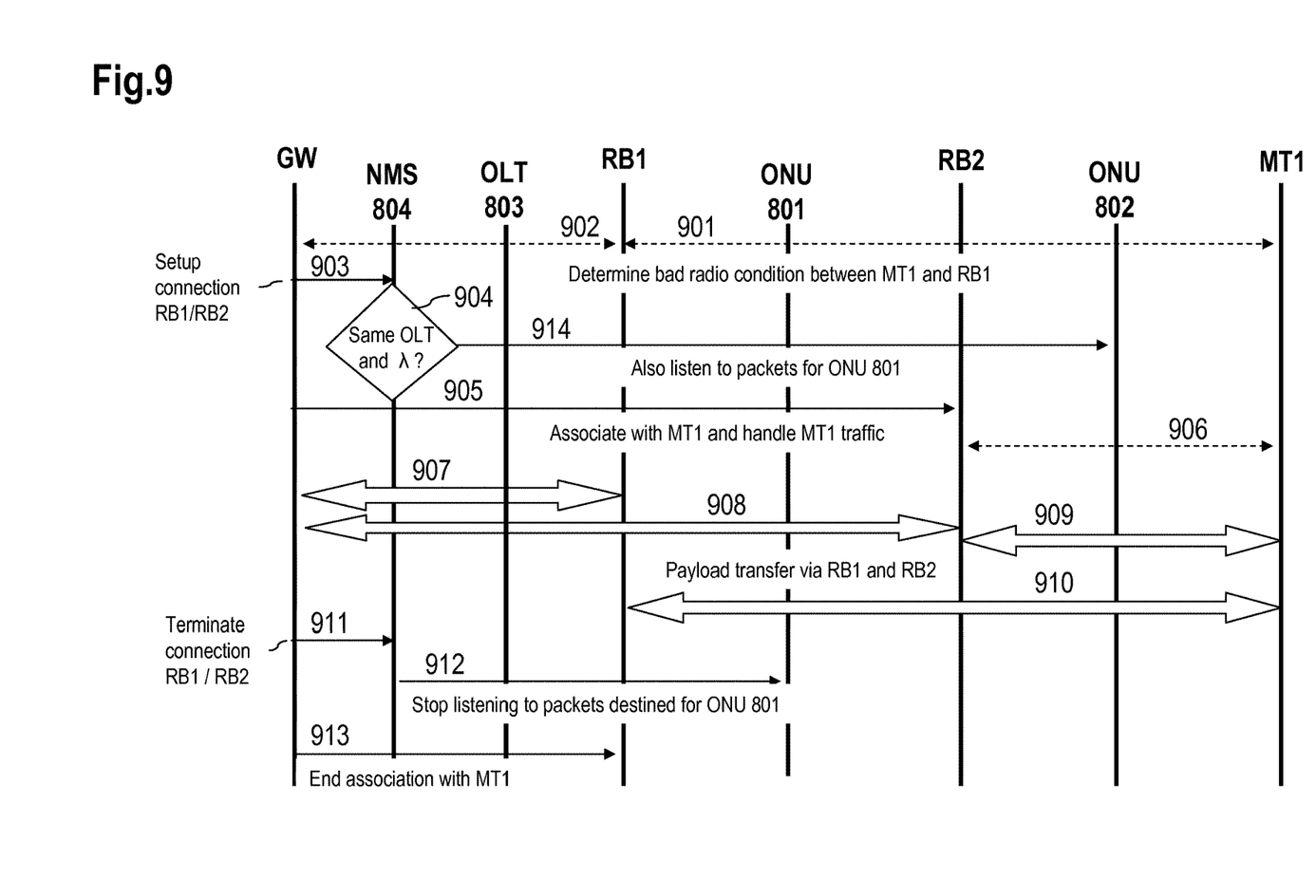
FIG. 9 shows a message diagram depicting message and data flows between the components shown in FIG. 8.

FIG. 9 shows a message diagram depicting message and data flows between the components shown in FIG. 8.

A message 901 indicates that a bad radio condition between the mobile terminal MT1 and the base station RB1 is detected. This information is conveyed (see message 902) to the gateway GW. Thus, the necessity for a handover can be determined by the gateway GW or its mobility management function by analyzing measurement reports received from the mobile terminal MT1.

The gateway GW instructs (see message 903) the NMS 804 to setup a connection between the base stations RB1 and RB2. The NMS 804 determines in a step 904 whether or not the base stations RB1 and RB2 are in the same PON; if this is the case, the NMS via a message 914 instructs the ONU 802 to also listen to traffic destined for the ONU 801.

A message 905 indicates that the gateway GW instructs the base station RB2 to become associated with (responsible for) the mobile terminal MT1 and handle its traffic. The base station RB2 and the mobile terminal MT1 may thus exchange pairing information (optional, see message 906).

As shown by message 907, traffic is conveyed from the gateway GW to the base station RB1 and to the base station RB2 (message 908). Traffic 910 is conveyed between the base station RB1 and the mobile terminal MT1. Also, traffic 909 is conveyed between the base station RB2 and the mobile terminal MT1.

By a message 911, the gateway GW instructs the NMS 804 to terminate the connection between the base station RB1 and the base station RB2. The NMS 804 via a message 912 thus instructs the ONU 801 to cease listening to the traffic destined for the ONU 801. In a message 913, the gateway GW instructs the base station to end its association with the mobile terminal MT1. Hence, the mobile terminal MT1 is now attacked and served by the base station RB2 via the ONU 802.

Hence, this solution allows that traffic in uplink and downlink direction may utilize a similar scheme. It is an option, however, to utilize this concept for downlink traffic only (which may be beneficial, because time-critical traffic of significant data rate is often merely conveyed in downlink direction).

Further Advantages:

Advantageously, the solution suggested can be used in combination with various transport technologies of the mobile back haul, e.g., PON or microwave radio. The PON may in particular comprise an NGOA (lambda-per-user concept).

Due to the reduction of unnecessary traffic, significant cost savings can be realized by applying this concept.

It is noted that the approach may also be applicable for general redundancy applications, e.g., standby servers.

LIST OF ABBREVIATIONS

CDMA Code-Division Multiple Access
CSMA Carrier Sense Multiple Access
CWDM Coarse Wavelength Division Multiplexing
DSL Digital Subscriber Line
DSLAM Digital Subscriber Line Access Multiplexer
DWDM Dense Wavelength Division Multiplexing
FDD Frequency-Division Duplexing
FDMA Frequency-Division Multiple Access
GW Gateway
IP Internet Protocol
LAN Local Area Network
LTE Long-Term Evolution
MME Mobility Management Entity
MNO Mobile Network Operator
NGOA Next Generation Optical Access
OLT Optical Line Termination
ONU Optical Network Unit
PON Passive Optical Network
P-GW PDN Gateway
PDN Packet Data Network
PTMP Point to Multipoint
PTP Point to Point
RAN Radio Access Technology
S-GW Serving Gateway
TDD Time-Division Duplexing
TDMA Time-Division Multiple Access
UDWDM Ultra Dense Wavelength Division Multiplexing
WDM Wavelength Division Multiplexing
WiFi see WLAN
WLAN Wireless LAN

The invention claimed is:

1. A method of processing data in a communication network, the method comprising:
    serving a first node by a second node and communicating between the first node and a third node wherein the third node is a terminal;
    wherein the second node, the first node and a fourth node are connected via a passive optical network capable of a point-to-multipoint connection, wherein the point-to-multipoint connection utilizes resources selected from the group consisting of:
    timeslots,
    frequencies, and
    codes;
    establishing said point-to-multipoint connection from the second node to the first node and to the fourth node;
    sending data carried by one of said resources destined for the first node from the second node to the first node and to the fourth node via the point-to-multipoint connection,
    sending a communication to the fourth node from the first node to listen to and process the data carried by one of said resources destined for the first node; and
    with the fourth node, discarding the data carried by one of said resources destined for the first node by the fourth node, before the communication is received by the fourth node, and processing the data carried by one of said resources destined for the first node, when the communication is received by the fourth node.

2. The method according to claim 1, wherein the sending the communication comprises informing the fourth node by the first node to process data destined for the third node via the second node.

3. The method according to claim 1, wherein the sending the communication comprises informing the fourth node by the first node to process data destined for the third node via a management node.

4. The method according to claim 1, wherein the second node comprises a gateway connected to a further network.

5. The method according to claim 4, wherein the gateway is configured to provide services selected from the group consisting of:

authorization services;
authentication services;
rating services; and
traffic shaping services.

6. The method according to claim 1, wherein the first node and the fourth node are edge nodes of the communication network.

7. The method according to claim 1, which comprises at least temporarily connecting the third node to the first node and/or to the fourth node via an air interface.

8. The method according to claim 1, which comprises handing over the third node from the first node to the fourth node.

9. The method according to claim 1, wherein the sending the communication comprises utilizing a resource of the network that is used for the communication between the second node and the first node.

10. The method according to claim 1, wherein the first node, the second node and/or the fourth node each comprises an underlying transport entity that provides the service of the network and wherein the sending the communication comprises, with the first node, informing the transport entity of the fourth node to process data destined for the third node.

11. The method according to claim 1 further comprising forwarding packets in the data destined for the first node to the third node.

12. A device for processing data in a communication network:
comprising:
  means for being served by a second node;
  means for serving a third node wherein the third node is a terminal, wherein the second node, the device, and a fourth node are connected via a passive optical network establishing a point-to-multipoint connection, wherein the point-to-multipoint connection utilizes resources selected from the group consisting of:
    timeslots,
    frequencies, and
    codes, and
  wherein the second node sends data carried by one of said resources destined for the device from the second node to the device and to the fourth node, wherein the data is initially discarded by the fourth node; and
  means for sending a communication to the fourth node from the device to listen to and process the data carried by one of said resources destined for the device, when a necessity for handover is detected.

13. The device according to claim 12, configured as an edge node of the communication network.

14. The device according to claim 13, configured as base station.

* * * * *